US011677901B2

(12) United States Patent
Shei et al.

(10) Patent No.: US 11,677,901 B2
(45) Date of Patent: Jun. 13, 2023

(54) INFRARED TOASTER

(71) Applicant: Marmon Foodservice Technologies, Inc., Osseo, MN (US)

(72) Inventors: Steven Shei, Fort Wayne, IN (US); Nick Mandarino, Carol Stream, IL (US); Dave Paton, Bartlett, IL (US); Benjamin Slotarski, Carol Stream, IL (US); Jason Pittenger, DeKalb, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 379 days.

(21) Appl. No.: 16/814,414

(22) Filed: Mar. 10, 2020

(65) Prior Publication Data
US 2020/0288912 A1 Sep. 17, 2020

Related U.S. Application Data

(60) Provisional application No. 62/817,277, filed on Mar. 12, 2019.

(51) Int. Cl.
*H04N 23/56* (2023.01)
*H04N 5/33* (2023.01)
(Continued)

(52) U.S. Cl.
CPC ............ *H04N 5/33* (2013.01); *A47J 37/0807* (2013.01); *A47J 37/0857* (2013.01);
(Continued)

(58) Field of Classification Search
CPC ................ A47J 37/0871; A47J 37/0807; A47J 37/0857; G06T 7/0004; G06T 7/90;
(Continued)

(56) References Cited

U.S. PATENT DOCUMENTS 1,900,737 A * 3/1933 Rohne ..................... A47J 37/08
99/391
2,316,699 A * 4/1943 Myers ...................... H05B 3/00
99/388
(Continued)

FOREIGN PATENT DOCUMENTS

WO 2002060302 8/2002
WO 2007013031 2/2007
(Continued)

OTHER PUBLICATIONS

International Search Report and Written Opinion for PCT/US2020/021977, dated Jun. 12, 2020.
(Continued)

*Primary Examiner* — Philip P. Dang
(74) *Attorney, Agent, or Firm* — Andrus Intellectual Property Law, LLP

(57) ABSTRACT

An infrared toaster and a method of toasting use a support configured to hold a food product relative to an infrared source. A light source and a camera are arranged relative to the support to illuminate the food product and capture digital images of the food product. A processor receives and analyzes successive images from the camera. The processor operates the IR source to achieve a predetermined toasting level of the food product. The processor operates the IR source to terminate operation directing IR energy when the predetermined toasting level is reached.

20 Claims, 7 Drawing Sheets

(51) Int. Cl.
*A47J 37/08* (2006.01)
*G06T 7/00* (2017.01)
*G06T 7/90* (2017.01)
*H04N 23/698* (2023.01)
*G06V 10/56* (2022.01)
*G06V 20/68* (2022.01)

(52) U.S. Cl.
CPC ......... *A47J 37/0871* (2013.01); *G06T 7/0004* (2013.01); *G06T 7/90* (2017.01); *H04N 23/698* (2023.01); *G06T 2207/10024* (2013.01); *G06T 2207/10048* (2013.01); *G06T 2207/30128* (2013.01); *G06V 10/56* (2022.01); *G06V 20/68* (2022.01)

(58) Field of Classification Search
CPC . G06T 2207/10024; G06T 2207/10048; G06T 2207/30128; G06V 10/141; G06V 10/56; G06V 20/68; H04N 5/2256; H04N 5/33
See application file for complete search history.

(56) References Cited

U.S. PATENT DOCUMENTS

| | | | | |
|---|---|---|---|---|
| 4,474,498 A * | 10/1984 | Smith | | A21B 1/245 219/400 |
| 4,873,107 A * | 10/1989 | Archer | | A21B 1/48 426/523 |
| 5,131,841 A * | 7/1992 | Smith | | A21B 1/245 432/152 |
| 5,277,105 A * | 1/1994 | Bruno | | F24C 15/025 99/476 |
| 6,444,955 B1 * | 9/2002 | Loveless | | F24C 15/325 219/400 |
| 6,595,117 B1 * | 7/2003 | Jones | | A21B 1/245 99/477 |
| 6,817,283 B2 * | 11/2004 | Jones | | A47J 37/0857 99/443 C |
| 7,217,906 B2 * | 5/2007 | Veltrop | | A47J 37/08 219/404 |
| 7,424,848 B2 | 9/2008 | Jones | | |
| 9,831,111 B2 * | 11/2017 | Busche | | H01L 21/6833 |
| 11,206,949 B1 * | 12/2021 | Cheng | | A47J 37/085 |
| 2005/0173400 A1 * | 8/2005 | Cavada | | F24C 7/04 219/405 |
| 2006/0218057 A1 * | 9/2006 | Fitzpatrick | | G06Q 10/04 705/28 |
| 2007/0075067 A1 * | 4/2007 | Beesley | | A47J 27/04 219/401 |
| 2008/0044167 A1 * | 2/2008 | Cavada | | A47J 37/0807 392/407 |
| 2014/0322408 A1 | 10/2014 | Khosla et al. | | |
| 2016/0120362 A1 * | 5/2016 | Fields | | A47J 37/08 99/378 |
| 2017/0079471 A1 * | 3/2017 | Riefenstein | | A47J 36/00 |
| 2017/0115008 A1 * | 4/2017 | Erbe | | F24C 7/081 |
| 2018/0202667 A1 * | 7/2018 | Cheng | | H05B 6/705 |
| 2018/0232689 A1 * | 8/2018 | Minvielle | | G06T 7/13 |
| 2018/0338354 A1 | 11/2018 | Bassill et al. | | |
| 2019/0167040 A1 * | 6/2019 | Bauer | | A21C 15/00 |

FOREIGN PATENT DOCUMENTS

| | | |
|---|---|---|
| WO | 2016131109 | 2/2016 |
| WO | 2016131109 A1 | 8/2016 |

OTHER PUBLICATIONS

Extended European Search Report for European Patent Application No. 20769017.3, dated Nov. 10, 2022.

* cited by examiner

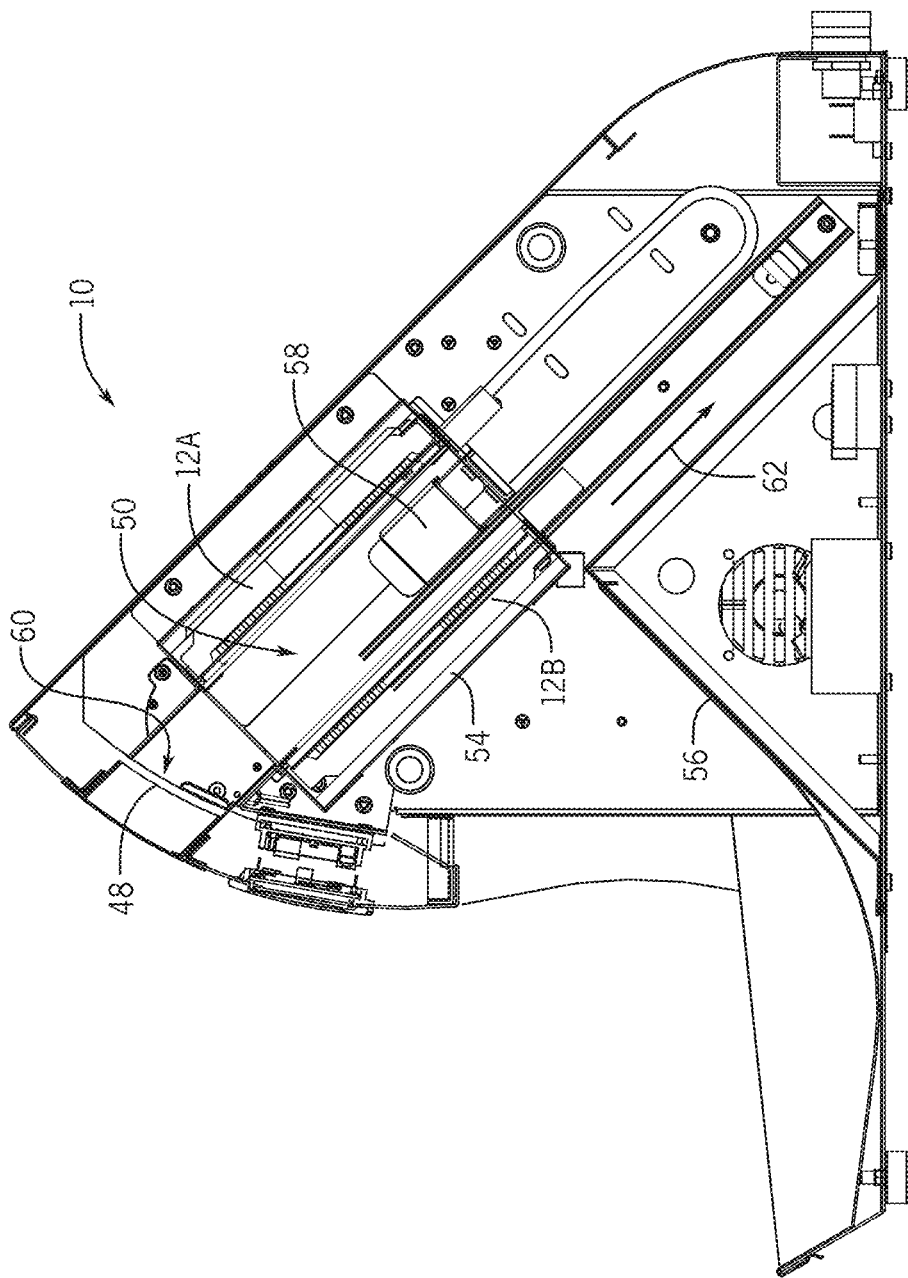

INFRARED TOASTER

CROSS-REFERENCE TO RELATED APPLICATIONS

The present application claims priority of U.S. Provisional Patent Application No. 62/817,277, filed on Mar. 12, 2019, the content of which is hereby incorporated by reference in its entirety.

BACKGROUND

Many restaurants serve toasted breads and toasted English muffins as regular menu items. Many other menu items include sandwiches that are comprised of toasted baked goods including toasted bread slices, buns, bagels, or English muffins.

Toasted food products have a distinctly different flavor than the same products prior to toasting. Toasting a food product also changes the bread product's color and its texture. In addition to changing flavor, color and texture, the toasting process often gives off a pleasing aroma.

Toasting food products like sliced bread, English muffins, bagels, pizza crust and other baked goods is usually accomplished using radiant or conductive energy transfer into the baked good from one or more heat sources. The process of toasting, which is also referred to herein as browning, is the result of a chemical reaction known as the Maillard reaction. The Maillard reaction is the reaction between carbohydrates and proteins that occurs upon heating and which produces browning.

It is believed that when the Maillard reaction goes too far or too long, carbohydrates in a bread product will oxidize completely and form carbon. Carbon absorbs light. The surface of a burned bread product therefore appears black. The term "burn" is therefore considered to be the thermally-induced oxidation of carbohydrates to a point where the carbon content of the bread product surface is high enough to absorb visible light that impinges on the bread product surface and therefore make the surface, or portions of the surface, of the bread product appear to an ordinary observer to be black in color.

A well-known problem with prior art toasters of all kinds is that they often cannot consistently achieve a uniform toasting across the bread product surface in the same amount of time. Because of their mass, surface irregularities and temperatures, bread products like English muffins are especially difficult to uniformly and consistently toast in a short amount of time period because the peaks and valleys of an English muffin's surface are at different distances from the IR source that effectuates the toasting process. Since many restaurant operators need and prefer to be able to toast bread products like English muffins as quickly as possible, attempts to shorten toasting time by simply increasing the input infrared energy usually results in more bread products being burned rather than toasted. A toaster and a method of toasting food products like bread and English muffins and which can consistently provide uniform browning in a relatively short period of time would be an improvement over the prior art.

BRIEF DISCLOSURE

An example of a toaster includes a support configured to hold a food product. An infrared (IR) source is arranged relative to the support. The IR source is operable to direct IR energy to the food product on the support. A light source is arranged relative to the support. The light source is operable to illuminate the food product on the support while the IR source operates to direct IR energy. A camera operates to capture digital images of the food product on the support. A processor receives the images from the camera. The processor analyzes successive images received from the camera. Based upon the analysis of the successive images, operates the IR source to achieve a predetermined toasting level of the food product. The processor operates the IR source to terminate operation directing IR energy when the predetermined toasting level is reached.

In further examples of the toaster, the light source operates to illuminate the support and the processor analyzes a digital image from the camera to determine the presence of the food product on the support. The processor determines a current toasting level of the food product from the successive images received from the camera based upon an amount of light in at least one test spectrum in each of the successive images. The processor analyzes a digital image from the camera to determine an initial color of the food product on the support and the processor determines a weighting value for the at least one test spectrum analyzed by the processor to determine a current toasting of the food product. The at least one test spectrum may include a green light test spectrum and a red light test spectrum. The weighting value for the red light test spectrum may increase with increases in a darkness of the initial color of the food product. A current toasting level of the food product may be determined by the processor further based upon a brightness compensation factor for at least one test spectrum. The processor may calculate at least one brightness compensation factor based upon a reference brightness for at least one test spectrum determined from a portion of an initial image of the food product, acquired by the camera. The portion of the initial image may be a portion that does not include the food product. The at least one brightness compensation factor may further be calculated based upon a current brightness for at least one test spectrum determined from a same portion of a subsequent image from the camera.

Other examples of the toaster may include an image tearing mask. The processor may apply the image tearing mask to each successive image received from the camera and passes or rejects the image for use in determining the current toasting of the food product based upon the application of the image tearing mask. The toaster may include a predetermined static mask. The processor may apply the static mask to images received from the camera to limit portions of the received images analyzed to determine a current toasting of the food product. The toaster may determine a dynamic mask based upon at least one image of the food product received from the camera. The dynamic mask includes at least one calculated boundary of the food product in the at least one image and the processor applies the dynamic mask to images received from the camera to limit portions of the received images analyzed to determine a current toasting of the food product.

Additional examples of the toaster may include an ejector operatively connected to the support and to the processor. The processor may operate the ejector to remove the bread product from proximity to the IR source when the predetermined toasting level is reached. The toaster may include the IR source configured as an annulus and the camera is positioned centrally to the IR source. The camera may include a wide-angle lens. The camera may be recessed from an outer surface of the IR source in a direction away from the bread product. The light source may be positioned centrally to the IR source and adjacent to the camera. The toaster may include a forced gas source and a duct that opens about the camera between the camera and the IR source to produce a flow of forced gas about the camera.

A method of toasting exemplarily includes holding a food product on a support relative to an infrared (IR) source. The IR source is operated to direct IR energy to the food product on the support. The food product is illuminated on the support. Digital images of the food product on the support are acquired with a camera. Successive images acquired by the camera are analyzed to determine a current toasting level of the food product based upon an amount of light in at least one test spectrum in each of the digital images acquired by the camera. When the current toasting level of the food product reaches a predetermined toasting level of the food product is determined. The IR source is operated to terminate direction of IR energy to the food product when the predetermined toasting level of the food product is reached. The method may include determining an initial color of the food product by analyzing an initial image from the camera and determining a weighting value, based upon the initial color, for the at least one test spectrum to determine the current toasting level of the food product. The method may further include determining a reference brightness for at least one test spectrum from a portion of the initial image that does not include the food product, determining a current brightness for at least one test spectrum from a same portion of a subsequent image from the camera, calculating a brightness compensation factor for at least one test spectrum from the reference brightness and the current brightness, and further using the brightness compensation factor for at least one test spectrum in calculating the current toasting level of the food product.

BRIEF DESCRIPTION OF THE DRAWINGS

FIG. 7 is a sectional view taken along line 7-7 of FIG. 6.

DETAILED DISCLOSURE

Figure 1:
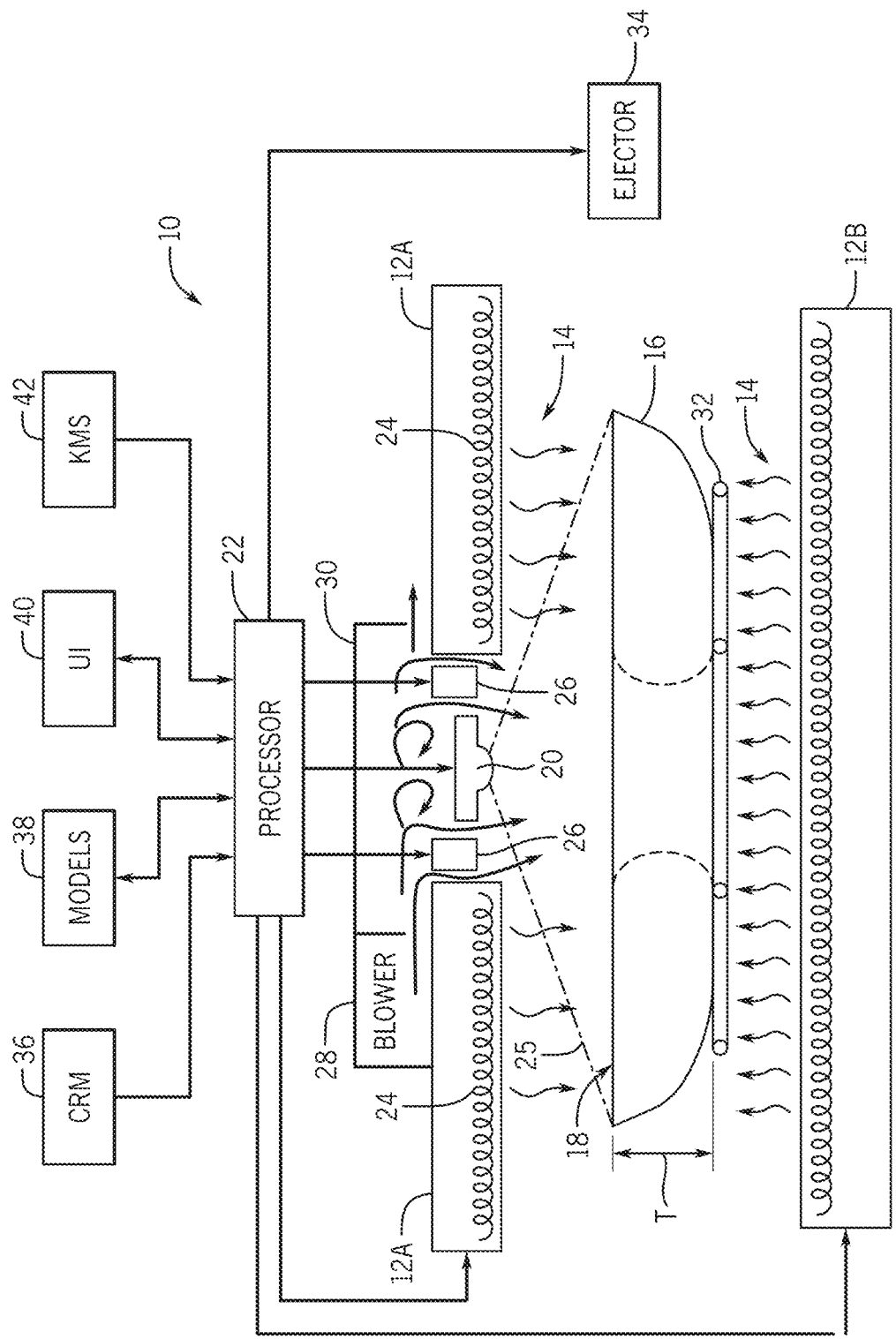
FIG. 1 is a system diagram of an exemplary embodiment of a toaster.

FIG. 1 depicts an exemplary embodiment of a toaster 10. The toaster 10 uses at least one infrared (IR) source 12, and as depicted in FIG. 1 exemplarily two IR sources 12. The IR sources may exemplarily take the form of an electrified wire coil, which when energized with electrical current, are known to heat and emit IR energy. It will be recognized that there are other sources of IR energy which may be used in other embodiments, including, but not limited to one or more IR emitting LEDs, for example an array arrangement of IR emitting LEDs. The IR sources 12 are arranged to direct IR energization 14 at a food product 16. In the embodiment depicted in FIG. 1, and as will be explained in further detail herein, the IR sources 12 may be configured and/or operated as a toasting IR source 12A and a heating source 12B, which is exemplarily an IR emitting source. Additional disclosure and description of toasters as well as the components and operation thereof is provided in the Applicant's co-pending U.S. Patent Application Publication No. 2019/0387926, entitled, "Infrared Toaster" and which is incorporated by reference herein in its entirety. Combinations of the features disclosed therein with the features disclosed herein will be recognized based upon the present disclosure.

The toaster 10 of FIG. 1 exemplarily presents an embodiment for toasting a single side of the food product 16, the toasting surface 18 which is arranged proximate the toasting IR source 12A. In this embodiment, the heating source 12B provides additional heat energy to the toasting system to elevate the overall temperature of the toasting system during operation. Such an embodiment may toast a second side of the food product 16 by performing a second toasting cycle on the food product 16 once the food product 16 has been flipped over within the toaster 10. In other embodiments, two toasting IR sources 12A may be arranged within the toaster 10 to simultaneously toast both surfaces of the food product 16. The food product is exemplarily a bread product that is desired to be toasted, although thermal treatments, exemplarily cooking, searing, broiling, or baking may be achieved in other embodiments. The bread products may include, but are not limited to sliced bread, English muffins, bagels, pizza, and flat bread, rolls, or buns. In still further embodiments, complete or partially complete sandwiches or sandwich portions (e.g. an open-faced sandwich half) may be toasted. In still further embodiments, the toaster may operate to melt cheese placed on the bread product.

In an embodiment, the toasting IR source 12A is configured with one or more sensors as described herein directed at the toasting surface to be toasted by the IR source. The toasting IR source 12A is arranged proximate the toasting surface and operates at a generally higher heat energy output. This is compared to the heating source 12B which may be a heating IR source, but may not include the associated sensors, or at least toasting sensors as described with respect to the toasting IR source 12A. Furthermore the heating IR source 12B may not be directed at the toasting surface and further may be operated at a generally lower heat energy output. In examples, the toasting IR source 12A is configured to direct IR energy at a surface of the food product 16 exemplarily by radiative heat transfer, while the heating source 12B may be configured to heat the food product 16 and the overall interior of the toaster by radiative, conductive, and/or convective heat transfer.

In an example, the toasting IR source 12A may include a resistive wire coil that is exposed towards the toasting surface 18 of the food product 16 which produces and directs IR energization at the toasting surface 18. The heating source 12B may include a restive wire as well, but the food product may be shielded from the resistive wire. In an example, a layer of glass and a layer of stainless steel may be interposed between the resistive wire and the food product. This helps to disperse the heat from the resistive wire of the heating source 12B to increase the temperature inside the toaster and increase the temperature of the food product, but provide limited or no toasting of the food product.

As previously noted, the challenge to toasting equipment is to quickly provide the amount of energy to the food product 16 to achieve a desired level or amount of toasting of the exterior of the food product, without overtoasting or undertoasting the food product within a narrow quality range. Furthermore, it is desirable to provide an apparatus and method for toasting in which a specified level of toasting is consistently achieved. In still further exemplary embodiments, it is desirable to provide an apparatus and method for toasting in which such specified levels of toasting are consistently achieved across a range of food product types. While foods, and more specifically baked goods, differ in a variety of physical properties, examples of the physical properties in which baked goods differ include surface area (A), thickness (T), and initial color (C).

Figure 2:
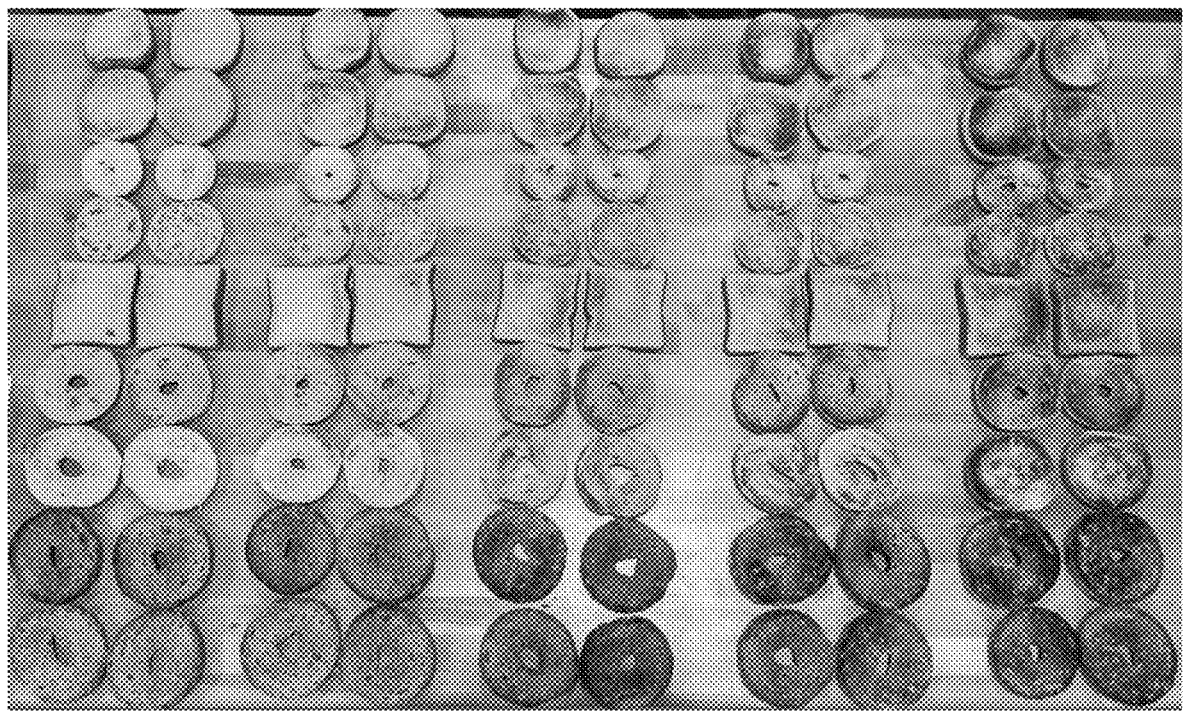
FIG. 2 exemplarily depicts toasting doneness levels.

FIG. 2 provides one example of different levels of toasting doneness on a variety of examples of baked goods. The examples provided in FIG. 2, are arranged with the same type of baked good oriented in horizontal rows, while vertical rows each represent a toasting level achieved across each of the types of baked goods. While FIG. 2 provides an example of five different toasting levels, it will be recognized that more or fewer levels may be used with different embodiments and the range between the levels may be broader to include more toasting and less toasting.

Referring back to FIG. 1, the toaster 10 includes features that will be described in further detail herein whereby the toasting process of the food product 16 can be closely monitored and the operation of components of the toaster 10 control to quickly toast the food product to a desired toasting level and ending the toasting process so as to not exceed the desired toasting level.

The toaster 10 includes at least one sensor, which is exemplarily a camera 20, that is oriented relative to the food product 16 and is directed towards the toasting surface 18 of the food product. While the camera 20 is shown in FIG. 1 in generalized form, more specific exemplary embodiments of such a camera apparatus will be disclosed in further detail herein and it will be recognized that embodiments of the toaster 10 may include other features within the camera 20 than those provided in the examples herein. The camera 20 exemplarily acquires digital image captures of the surface of the food product that is being toasted and provides these digital image captures to a processor 22 for analysis and resulting control of the IR sources 12.

FIG. 1 depicts the camera 20 in a position arranged centrally to the toasting IR source 12A and directed towards the toasting surface 18 of the food product 16. Exemplarily, the toasting IR source 12A is annular in shape with the camera 20 positioned interior of the toasting IR source 12A. As will be described in further detail herein, it is desirable to protect the camera 20 from heat from the IR sources 12, therefore, the camera 20 is recessed from the heating element 24 of the toasting IR source 12A. However, as will be explained herein, it is desirable for a field of view 25 of the camera 20 to be wide so that the digital images captured by the camera 20 include at least a large portion of the toasting surface. The camera 20 may include a wide-angle lens to provide the field of view 25. Therefore, there is a limit to the distance by which the camera 20 can be recessed relative to the toasting IR source 12A. In some embodiments, the digital images may capture a field of view that extends beyond a perimeter of the food product, while in other embodiments, the digital images may capture a field of view that includes only a portion of the toasting surface.

To produce accurate analysis of food product toasting, supplemental light is projected onto the toasting surface 18. This supplemental light is provided by one or more light sources 26. The light sources 26 are exemplarily LED light sources arranged proximate to the camera 20, for example central to the toasting IR source 12A. In other embodiments, the light sources 26 may be located in other positions, for example at the sides of the toaster 10; however, it has been found that increasing the relative angle of the light sources 26 towards normal to the toasting surface 18 improves the illumination of the toasting surface 18 by the light sources 26. The light sources 26 may operate to emit visible spectrum light, IR spectrum light, UV spectrum light, or specific wavelengths or combinations of wavelengths within this range depending upon the specific embodiments as described herein. Exemplary and non-limiting embodiments may project green spectrum wavelengths of visible light, red spectrum wavelengths of visible light, IR spectrum wavelengths of light, or all visible spectrum wavelengths of light (e.g. white light).

As previously noted, it is desirable to protect the camera 20 from excessive heat produced by the heating elements 24 of the toasting IR source 12A. Additionally, the inventors have identified that the temperature of the light sources 26 can vary the intensity of the light produced, thus leading to detection errors as will be discussed in further detail herein. Additionally, it is desirable to limit the overall exposure of the light sources 26 to excessive heat. An air source, which may be a blower 28, but may be other sources of air movement as will be recognized by a person of ordinary skill in the art, directs a flow of air about and past the light sources 26 and the camera 20.

Air flowing past the camera 20 in the direction of the food product 16 also produces an air shield about the lens of the camera 20 which protects the camera 20 from collecting grease, condensation, food particles, dust, or other contaminants that may cloud or obscure the images captured by the camera 20. However, this flow of air may also have the negative impact of locally cooling the food product 16 in the location of this air flow. Therefore, an air chamber 30 configured about the camera 20 and the light sources 26 enables circulation of the air relative to the camera and light sources 26. This cools the camera 20 and light sources 26 and warms the air that is directed past the camera 20 towards the food product 16. The air chamber 30 also vents a portion of the circulated air out of the air chamber 30 away from the food product 16.

The food product 16 is supported between the IR sources 12 by a food product support 32. Embodiments of the food product support 32 may take a number of forms as will be described in further detail herein and may be operable in such forms to facilitate loading and ejection of the food product 16 relative to the toaster 10. The food product support 32 holds the food product 16 within the toaster 10 at a predefined position relative to at least the camera 20 and the toasting heat source 12A. The food product support 32 may be, but is not limited to a grate, a door, a platform, or a conveyor. As will be described in further detail herein, an ejector 34 may further be operated by the processor 22, to facilitate mechanical ejection of the food product in order to rapidly end the toasting process.

The processor 22 is communicatively connected to a computer readable medium (CRM) 36 which is exemplarily non-transient and upon which is stored computer readable code in the form of computer programs or software that upon execution of such computer readable code by the processor 22 causes the processor to operate in a manner to carry out the functions and actions as described in further detail herein. It will be recognized that the processor 22 is exemplarily incorporated into any of a variety of known controller circuits, integrated circuits, microcontrollers, or associated circuitry. The processor 22 may be part of a central processing unit (CPU) which includes integrated memory, although in embodiments the CRM 36 may be a separate component or communicatively connected to the processor 22. The processor 22 accesses software or firmware in the form of computer readable code stored on the CRM 36 as either integrated memory or external memory. The processor 22 executes the computer readable code as an instruction set to carry out the functions as described herein, including the receipt of inputs, calculations, and outputs as will be described. The processor 22 receives the digital image captures from the camera 20 and uses image processing techniques as described in further detail herein to monitor the toasting process and provide operational commands to the components of the toaster 10 in a manner so as to achieve a desired level of toasting of the food product 16.

The processor may further be communicatively connected to a source of models or algorithms 38, which may be stored on a non-transient computer readable medium and such models may define parameters or algorithms used for a particular type of food product to be toasted or a particular requested toasting operation. Examples of equations as may be used during the operational process are provided herein, such equations may be stored on the non-transient computer readable medium. Models 38 may include various toasting level models which may be represented as a curve of a determined amounts of reflected light from the food product representing different toasting levels. The models 38 may be stored locally to the processor and the toaster 10, or may be stored at a remote location and instead the communicative connection may be across a local area network or a wide area network. As will be explained in further detail herein, the processor 22, upon receiving inputs or detecting particular conditions may select from the information stored on the source of models 38. It will be recognized that this may also be stored on the CRM 36.

The toaster 10 may include a user interface 40 by which the toaster 10 receives one or more user inputs to control a toasting operation. In exemplary embodiments, the user interface 40 may be physical buttons or may be a touch-enabled graphical display. In still further embodiments, the user interface may be presented on a personal computing device communicatively connected to the toaster 10, for example through Wi-Fi or Bluetooth communication protocols. Examples of inputs that may be received include 1 sided or 2 sided toasting; an identification of the food product, and a desired toasting level.

In still further embodiments, the processor 22 of the toaster 10 may be communicatively connected to a kitchen management system (KMS) 42, which may exemplarily be a locally implemented or remotely implemented computer system that operates to manage the customer orders, order completion status, monitor inventory levels and operation of devices in the kitchen, and/or to provide operational instructions to devices within the kitchen. In an exemplary embodiment, a communicative connection between the processor 22 and the KMS 42 may enable the KMS to provide the operational instructions, for example the type of food product to toast, the sides of the food product to toast, and the toasting level to be achieved to the processor 22 without further input from a user or worker. While not depicted, a food product dispenser, for example a baked goods dispenser, may be operatively connected to the toaster 10 and communicatively connected to the KMS, and coordinated operation between the devices may result in the automated loading of the toaster 10 with the appropriate baked good and operation of the toaster 10 to achieve the desired toasting level of that baked good.

Figure 3:
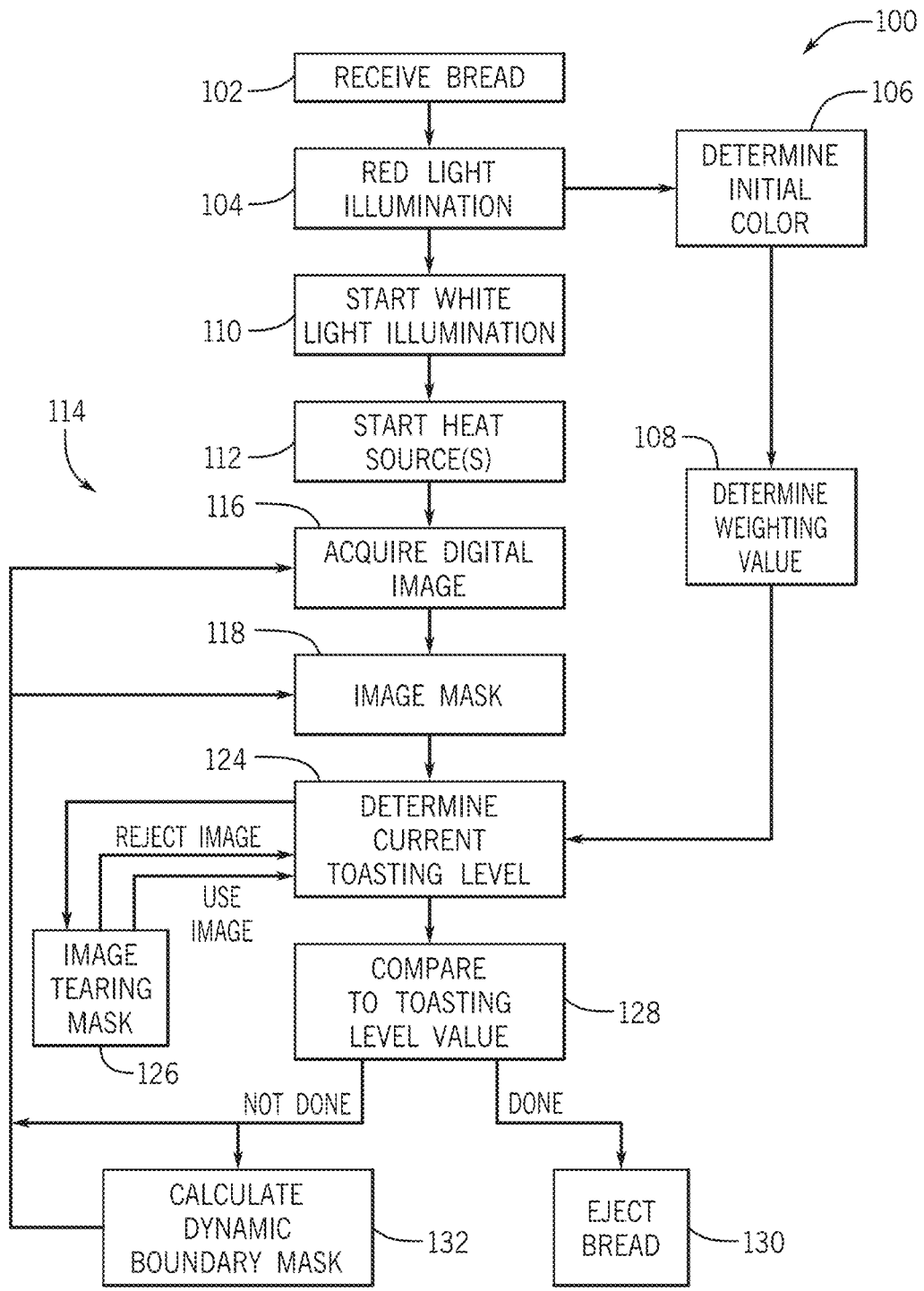
FIG. 3 is a flow chart of an exemplary embodiment of a method of toasting.

FIG. 3 is a flow chart that depicts an exemplary embodiment of a method 100 of toasting a food product and which will be described in further detail herein, for example with reference to the toaster 10 as depicted and described above with respect to FIG. 1 and with the exemplarily embodiment of a food product of a baked good. The method 100 begins with bread being received at 102 into the toaster. Additionally, the toaster receives a desired toasting level for the bread. This may be a preset toasting level, for example when the toaster is configured to provide the same toasting level in each toasting operation. Alternatively, the desired toasting level may be input by a user or received from the KMS as described above. In still further exemplary embodiments, the received piece of bread may be identified and the particular identification of the bread (e.g. white, wheat, rye, bagel, English muffin, or bun) may have a preset associated toasting level. The toasting levels may be defined as one or more curves or functions of the determined light amount as described in further detail herein.

At 104, the toaster illuminates the toasting chamber with red light. The system determines if a food product has been loaded into the toaster. The inventors have discovered that red spectrum light is beneficial for determining if the toasting chamber is empty or has received a baked good to toast, as the red light provides contrast between the food product and the interior of the toaster across a wide range of food types, shapes, and initial colors. If an identification of the baked good has not yet otherwise been received, the system can determine an initial color of the baked good at 106. In doing so, the bread is illuminated at 106 and an image is captured of the illuminated bread and a determination of the initial color of the bread is made at 106. In some embodiments this illumination can be with white light or may use a subset of visible light spectrum for illumination purposes. In one embodiment red light illumination may be used for contrast between different initial colors of available bread. The in some embodiments, red spectrum of light may be useful for both light colored breads and dark colored breads, and also helps for the system to distinguish between the existence of bread in the toaster and an empty toaster.

Different spectrums of light may be preferred or produce preferred results, based upon the initial color of the food product, when used for evaluating toasting progression and toasting level. In examples, a combination of one or more of green spectrum light, blue spectrum light, and red spectrum light may be used for the toasting analysis. In a further example, analysis of green spectrum light and red spectrum light may be used. At 108 a weighting value for each of the test spectrums is determined. In an example, the weighting may be a function of the determined initial color of the food product. The food product initial color may be normalized based upon an expected range of food product initial colors. The determined initial color of the food product may be compared to one or more thresholds associated with different weighting values. In another example, the weight value for each of the light test spectrums be determined by function. It will be recognized that a weight of 0.0 may have the effect of that test spectrum not being used in a determination. It will further be recognized that the weighting may have the effect of only a single test spectrum being used for a determination. In general, it has been determined that the red light test spectrum is advantageous for determination of toasting of food products with a darker initial color, for example dark rye, while the green light test spectrum is advantageous for determination of toasting food products with a lighter initial color, for example white bread.

As will be described in further detail herein, the toasting determination may be calculated based upon part upon the following equation, wherein the parameters $W_G$, $W_B$, and $W_R$ are the respective weights applied to each of the green, blue, and red test spectrums.

$$R_{DN}=(W_G(RB_{BG}-[CB_{BG}*BF_{NBG}])+W_B(RB_{BB}-[CB_{BB}*BF_{NBB}])+W_R(RB_{BR}-[CB_{BR}*BF_{NBR}]))*MC \quad \text{Eq. 1}$$

Where:
MC=Mask Compensation Factor
$BF_{NBG}$=Brightness Factor Non Bread Green
$BF_{NBB}$=Brightness Factor Non Bread Blue
$BF_{NBR}$=Brightness Factor Non Bread Red
$RB_{NBR}$=Reference Brightness Non Bread Red
$RB_{BR}$=Refrence Brightness Bread Red
$RB_{BG}$=Refrence Brightness Bread Green
$RB_{BB}$=Refrence Brightness Bread Blue
$CB_{BR}$=Current Brightness Bread Red
$CB_{BG}$=Current Brightness Bread Green
$CB_{BB}$=Current Brightness Bread Blue
$R_{DN}$=Raw Doneness Value Returning to 110, after the bread has been identified, the bread can then be illuminated with white light at 110. The white light is used for the evaluation of toasting level during the toasting process. It will be recognized that in embodiments wherein white light (or the same light spectrum) is used to illuminate the food product to determine the initial color of the food product at 106, then 106 and 110 may be effectively combined. This would also be true for other examples wherein the same light spectrum is used to illuminate the food product both for the initial color determination as well as to monitor the toasting progression. As noted above, it will be recognized that in other embodiments alternative colors or combinations or isolated color or colors of illumination light wavelengths may be used, including, but not limited to, illumination using green spectrum wavelengths of light. While test spectrums in the red, green and/or blue wavelengths are described in examples herein. It will be recognized that in other embodiments, other selected test wavelength spectrums may be used, including but not limited to yellow, orange, purple, infrared, or UV spectrums. In examples, particularly identified baked goods may be analyzed for toasting with a combination of these test wavelength spectrums and different identified baked good, or baked goods having particular properties may be analyzed with such different combinations. As previously described, use of particular test spectrum wavelengths may be adjusted with a weighting of various test spectrums based upon an identification of the baked good or an identification of a property of the baked good.

At 112 the heat sources are activated. As noted above, the heat sources may exemplarily be wire coils that upon receiving electrical energization heat up to a glowing temperature at which the coils emit IR radiation towards the bread held in the toaster. As previously noted, in embodiments of the toaster, the toaster may be configured to toast a single side of the received bread and a heat source on a side opposite of the bread from the toasting side of the bread may be used to increase the ambient temperature of the toaster while not being operated to achieve a particular toasting level on the side of the bread opposite the toasting side.

The method enters a toasting level evaluation sub-process 114 which is repeatedly carried out until it is determined that the bread has been toasted to the desired toasting level. This sub-process 114 begins at 116 with the acquisition of a digital image of the bread with the camera. The acquisition of a digital image at 116 may further include IR filtering. The IR filtering may be performed physically with an IR lens of the camera or may be performed digitally in the image acquisition process by the camera. In either event, the digital image acquired at 116 is one in which the received bread is depicted within the toaster absent the IR energization emitted from the heat sources. The illumination of the toasting surface from 110, for example by white light, also helps in the acquisition of this image, and supplemental light saturates out effects from the light emitted by the heat sources.

At 118, an image mask is acquired. In an example, a static or default image mask may be stored locally to the processor of the toaster. The static image mask may be the same mask for all food products or different static mask may be stored for different types of food products (e.g. English muffin, bagel, sliced bread, bun). If an identification of the food product is known, then a corresponding static mask may be selected and used. In a still further example, a dynamic image mask may be created from the image acquired at 116. In an example, such a dynamic image mask may be created by modifying the static image mask as described above. Once a dynamic image mask is created, in examples, it may be used throughout the toasting determination process, while in other examples, the dynamic mask may be iteratively updated during subsequent cycles of the imaging process. The image mask may exemplarily exclude all portions of the digital image that are not part of the food product and this image mask restricts the portions of the digital image data that are evaluated to determine the toasting level of the bread.

In examples, the doneness value calculated according to Eq. 1 above may be created with respect to a static mask, which determines the portions/area of the digital image data that is evaluated in determining the doneness value. Therefore, if a dynamic mask is used that results is a different area of the digital image data being used, a mask compensation factor, MC, may be required to maintain accurate determinations. The mask compensation factor may be calculated based upon light spectrum measurements from the digital image first with static mask and then with the dynamic mask:

$$MC = \frac{(SMA_R + SMA_G + SMA_B)}{(DMA_R + DMA_G + DMA_B)} \quad \text{Eq. 2}$$

Where:
$SMA_R$=Static Mask Average Red value
$SMA_G$=Static Mask Average Green value
$SMA_B$=Static Mask Average Blue value
$DMA_R$=Dynamic Mask Average Red value
$DMA_G$=Dynamic Mask Average Green value
$DMA_B$=Dynamic Mask Average Blue value At 124, the current toasting level of the surface of the food product is determined from the amount of light reflected from the toasting surface and captured in the digital image from the camera. The image mask focuses the analysis to a portion of the acquired digital image that yields the most information relative to the toasting level determination. As previously noted, not all spectrums of light returned in the digital image may be used, and some spectrums may be weighted more or less compared to other spectrums of light. Additionally, the acquired digital image is evaluated using an image tearing mask at 126 which blocks the portions of the acquired digital image attributed to the bread and compares non-bread portions of the image against a previous image in order to determine if the images represent a discontinuity between the images due to movement of the bread within the toaster or image acquisition error by the camera. The image tearing mask evaluation returns an instruction of whether to reject the acquired digital image for this cycle of the process 114 or to use the image within the process 114.

If the image is to be used, then a raw doneness value is calculated, for example according to Eq. 1 described above using a weighted determination of the amount of light at the test spectrums. Looking further at Eq. 1, a reference brightness of the bread at each test spectrum $RB_{BX}$, is acquired from the initial digital image. Those reference brightnesses are used in each iterative calculation of the raw doneness value. For each subsequently acquired digital image that is accepted by the image tearing mask evaluation at 126, a current brightness of the bread at each test spectrum $CB_{BX}$ is acquired from the acquired image. As will be explained in further detail herein, the temperature within the toaster, and particularly, the temperature of the light sources within the toaster can change the light intensity output from the light sources. This is corrected for in the raw doneness value calculated with Eq. 1 with the inclusion of brightness correction factors $BF_{NBX}$ for the light sources of each of the test spectrums of light.

In examples, the raw doneness value may be used as the current toasting level of the food product determined at 124 from the determined amounts of light at the test spectrum, test spectrums, or weighted test spectrums in accordance with Eq. 1. In other examples, this raw doneness value may be converted to a current toasting level exemplarily by applying a function of the form:

$$F_{DN}=fn([R_{DN}]) \quad \text{Eq. 3}$$

The function to determine the final doneness value may exemplarily be linear, exponential, or logarithmic to the raw doneness value and places the raw doneness value on the same scale as the toasting level models or definitions.

At 128, the converted toasting level is compared to the received desired toasting level value and a determination is made whether the toasting is done or is not done. If the toasting process is complete and the desired toasting level value achieved, then at 130 the toaster operates to eject the bread from the toaster to rapidly end the toasting operation so as not to over shoot the desired toasting level or to burn the toasted bread.

If the desired toasting level has not yet been achieved, then the sub process 114 repeats by acquiring a new digital image 116 and repeating the evaluation steps thus described. In an exemplary embodiment, one cycle of the sub process 114 is performed every 250 milliseconds, although it will be recognized that in alterative embodiments the period between digital image acquisition and evaluation may be longer or shorter while remaining within the scope of the present disclosure. The sub process 114 thus repeats until it is determined that the desired toasting level of the bread has been achieved and the bread is ejected from the toaster.

Optionally, at 132 a dynamic boundary mask is calculated to evaluate any change in the surface area of the toasting surface due to the toasting operation by comparing the current digital image to a previously acquired digital image and evaluating the change in pixel values between the two images. As previously noted some embodiments may use a standardized static image mask, may calculate a dynamic mask for use throughout the toasting process, or may update the image mask during a toasting process. If the area of the bread has shrunk then these portions of shrinkage will appear as areas of great intra-image change that exceed any excepted amount of change due to toasting between any two subsequently acquire images. The areas of change due to bread shrinkage are added to the updated dynamic mask at 118 to provide a dynamic mask which accounts for this potential of bread shrinkage.

It will be recognized that embodiments of the method 100 may include more or fewer steps as those as presented and described above. In addition to the method features as described above, additional control processes may be implemented within the method 100 to further refine and/or control the results of the process as will be described in further detail herein.

In an exemplary embodiment, the process includes an initialization and heating dwell time between when the heat sources are started and the first digital image is acquired. In an exemplary embodiment between four and five seconds of dwell time is used prior to acquisition of the initial reference image of the bread for toasting evaluation. In embodiments, the one or more scales or relationships may be used to evaluate the determined returned light against the current toasting level. In an exemplary embodiment, two or more scales or relationships may be used to represent the range of toasting levels. In one embodiment, each toasting level is provided with a separate function defining the returned light and the toasting level, while in other embodiments one function may represent progression between two or more toasting levels (e.g. light and medium toasting levels), while at least one other function is used to represent progression towards one or more other toasting levels (e.g. dark toasting levels).

As previously noted, the heat from the heat sources can impact the intensity of the light produced by the light sources. These changes in light intensity can be registered in the image processing as additional toasting or slowed toasting. In an exemplary embodiment, an additional camera may be added to the toaster and directed either at the light source or at a neutral portion of the toaster, for example, insulation or other structure on a wall between the light source and the heating element. The readings from this camera or light sensor provide a reading or measurement of light output intensity from the light sources. Measurement of light intensity can be used as a compensating factor in order to ensure consistent evaluations of toasting level despite fluctuations in output light intensity by the light sources. This brightness compensation factor $BF_{NBX}$ is exemplarily calculated for each light source/test spectrum as:

$$BF_{NBX} = \frac{RB_{NBX}}{CB_{NBX}} \quad \text{Eq. 4}$$

In calculation of the brightness compensation factor, the initial digital image is used to calculate a reference brightness $RB_{NBX}$ at each test spectrum. This is exemplarily done by using a portion, or portions, of the initial digital image known to not include the food product. In an example, this portion may include areas otherwise obscured by the image mask when evaluating the toasting level of the food product. The brightness compensation factor is a ratio of the reference brightness to an obtained current brightness $CB_{NBX}$, for the current digital image. The current brightness is calculated for each test spectrum and using the same portion or portions of the current digital image as used in the initial digital image. In examples of the use of the brightness compensation factor as described above, the compensation factor can also adjust the doneness value determinations to maintain accuracy in the event of an error in the operation of one of the light sources, for example a burn out or failure of one of the light sources to operate properly.

As noted above, some examples of the toaster 10 may include a heating source 12B arranged to provide additional heat energy into the toasting system, while provide little or no toasting of the food product itself. In an example, the heat source 12B may include a resistive wire. The resistance of the wire, and thus the current through the wire may change with the temperature of the resistive wire. Therefore, an ammeter or other current sensor may be used to determine the temperature of the heat source 12B and the heat source 12B operated to a set point temperature or within a set temperature range. Furthermore, the control of the lower heater temperature may be based upon the following equation:

$$T_{LHn}=fn(T_{LH_{n-1}}, TT_{LH}, t_I, t_r) \quad \text{Eq. 5}$$

Where:
$T_{LH}$=Temperature Lower Heater
$TT_{LH}$=Target Temperature Lower Heater
$t_I$=Idle Time in seconds
$t_r$=Time Since Last Measurement In still further exemplary embodiments of the method one or more back up processes that provide additional calculations of toasting completion and come out which may other indicate that the bread is at risk of burning or becoming over toasted and thus result in override ejection of the bread from the toaster. One such back up process is a "forward progress" algorithm that compares the change in doneness level between subsequent evaluation cycles. In an exemplary embodiment, a moving average (e.g. over five previous evaluation cycles) of the doneness level change must remain positive for the toasting process to continue. Conceptually speaking, the toasting process is expected to accelerate until the point of saturation (e.g. burning) at which point the rate of change in doneness level will level off or go negative. Therefore, as long as the toasting process is following the expected logarithmic pattern, the toasting process is allowed to continue.

In another exemplary embodiment, a latent heat model is used to perform an alternative calculation of the toasting level that is independent from the digital images acquired by the camera. The latent heat model back up method thus can provide a control on the toasting operation in the event of an image acquisition error by the camera, image processing errors, or malfunction of the cameras and/or light sources required for the image acquisition. In still further embodiments, the toaster may instead operate in a latent heat controlled mode in the event that one or more errors prevent control based upon the digital image acquisition as described above. In a latent heat control the system energy may exemplarily be represented by the following equation:

$$\text{System Energy}=(\int_O^{T_t} v(t) i(t) dt) - (Ae^{Bt}) \quad \text{Eq. 6}$$

Where $T_t$=Toast Time in seconds

In the latent heat model control, the toasting time is adjusted based upon the latent heat stored in the toaster. This is calculated by keeping track of how much energy has been input into the toasting system from the heating cycles and how much energy has been lost based upon an assumed toasting system cooling curve. In such an embodiment, an expected toasting time is calculated based upon the desired toasting level and the heat already in the toasting system and the ongoing input of heat energy into the toaster during the toasting operation. If this expected toasting time is exceeded, or is exceeded by a predetermined threshold percentage, or threshold percentage based upon the desired toasting level, then the system may override the toasting process and eject the bread to prevent the bread being over toasted or burned. Latent heat control is described in further detail in Applicant's pending U.S. patent application Ser. No. 16/556,826, entitled "Latent Heat Toaster Control" which is incorporated by reference herein in its entirety.

Figure 4:
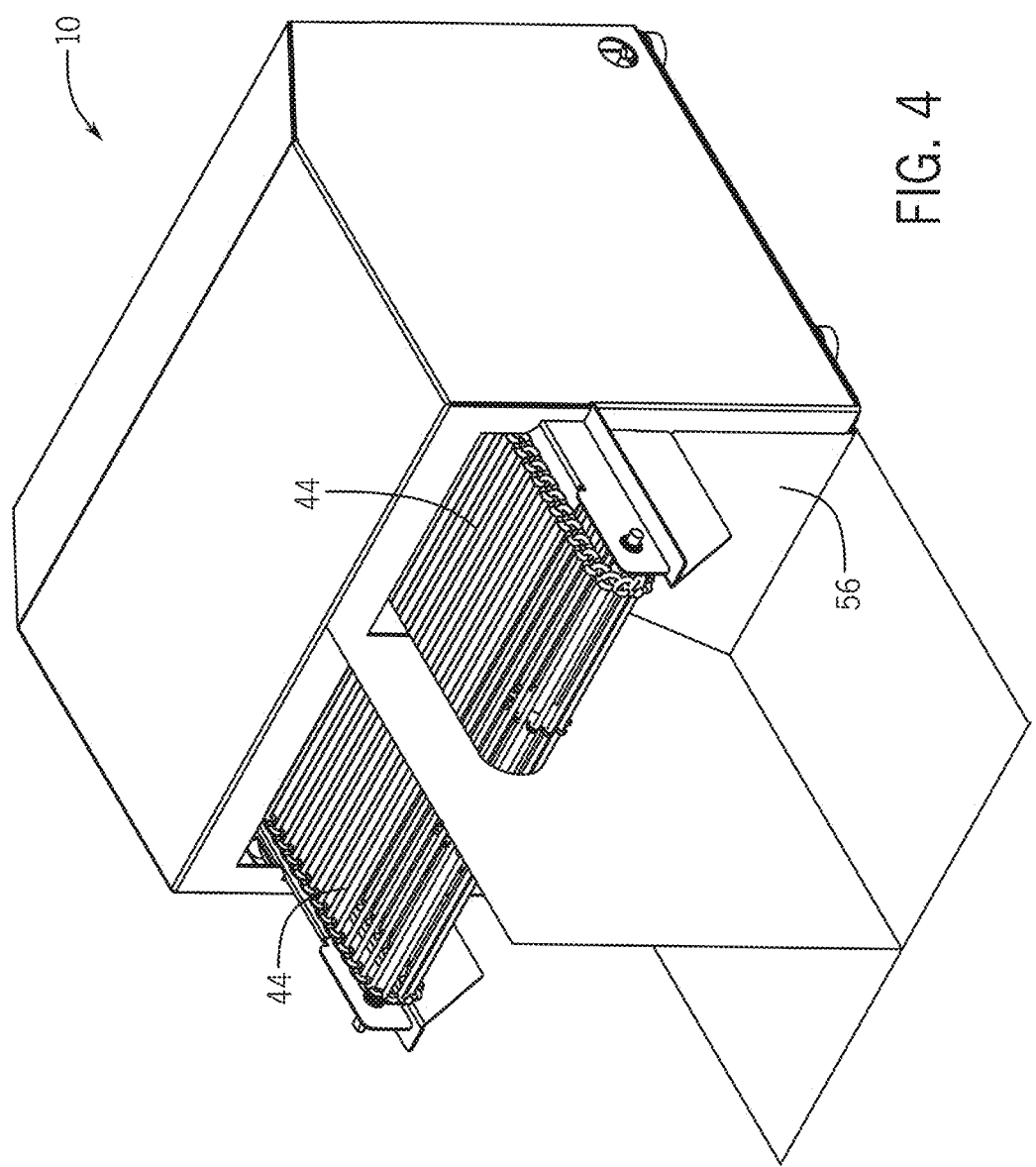
FIG. 4 depicts an exemplary embodiment of a toaster in a horizontal configuration.
Figure 5:
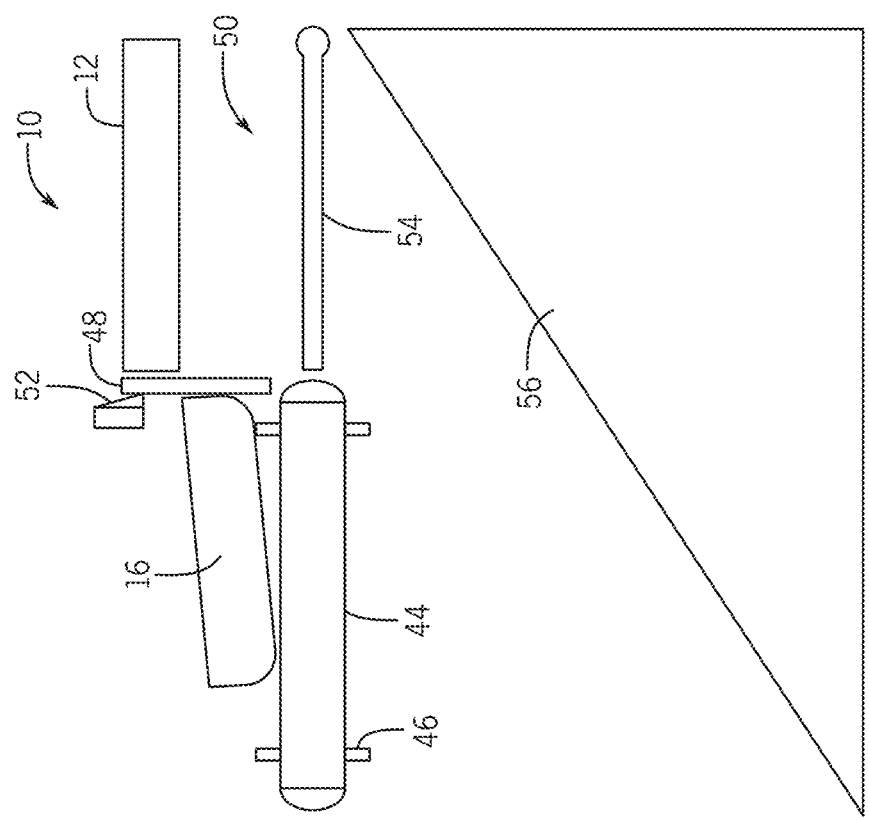
FIG. 5 is a system diagram of the toaster in a horizontal configuration.

FIG. 4 depicts an exemplary embodiment of a horizontally oriented toaster 10. FIG. 5 presents a schematic view a horizontally oriented toaster 10 as well. It will be recognized that like reference numerals between these figures and FIG. 1 are used to indicate like components and to incorporate the description of those components as provided earlier herein. It will be recognized that still further embodiments may combine those features as described above with FIG. 1 with the features as described herein with respect to FIGS. 4 and 5 in addition to the other disclosure as provided in the present application to arrive at embodiments within the scope of the present disclosure.

The toaster 10 depicted in FIGS. 4 and 5 exemplarily includes at least one conveyor 44. As shown in FIG. 4, the toaster 10 may include two conveyors 44 arranged in parallel operation to one another. Those conveyors 44 may extend through the toaster 10. The conveyors 44 may be operated to advance a food product (not depicted) to a predetermined position within the toaster 10 relative to an IR source as described above contained therein. It will be recognized that each conveyor may have at least one associated IR source within the toaster 10.

FIG. 5 provides examples of additional features which may be found in examples of the toaster 10. The conveyor 44 in FIG. 5 only operates to deliver the food product into the toaster 10, The conveyor 44 may include dividers 46 extending outward from the conveyor 44 that help to delimit spaces to hold the food products thereupon and to provide regular spacing and/or order to the food product 16 placed thereon.

The toaster 10 may include a safety door 48, which serves multiple purposes. In a first purpose, the safety door blocks user access to the toasting area 50 relative to the IR source 12. This protects the user such that when the safety door 48 is closed, a corresponding limit switch 52 is activated enabling the IR source 12 to be activated and heated. When the safety door 48 is open, the limit switch 52 is also opened and the IR source 12 is prevented from energizing.

Additionally, in the event that a food product is misplaced on the conveyer 44, as is depicted in FIG. 5, then, the misplaced food product 16 may engage an exterior of the safety door 48 which thereby prevents further advancement of the food product 16 despite advancement of the conveyor 44. Further advancement of the conveyor 44 will advance the conveyor 44 relative to the misplaced food product 16 until the food product 16 is in proper alignment with both the conveyor 44 and the safety door 48 in a manner to be received into the toasting area 50 upon the next toasting operation.

In the example shown in FIG. 5, the toasting area 50 is further defined by a bottom heater or tray 54 which supports the food product within the toasting area 50 relative to the IR source 12. Upon the determination that the desired toasting level has been achieved in the food product, the bottom heater and/or tray 54 pivots or otherwise opens to release the toasted food product 16 onto an exit ramp 56 dispense from the toaster 10. Examples as depicted and described above with respect to FIGS. 4 and 5 may exemplarily have an advantage of functional returning the toasted food product to a location similar to the location wherein the food product was first located into the toaster and in a same orientation (e.g. toasting surface side up) as in which the food product was loaded into the toaster 10.

Figure 6:
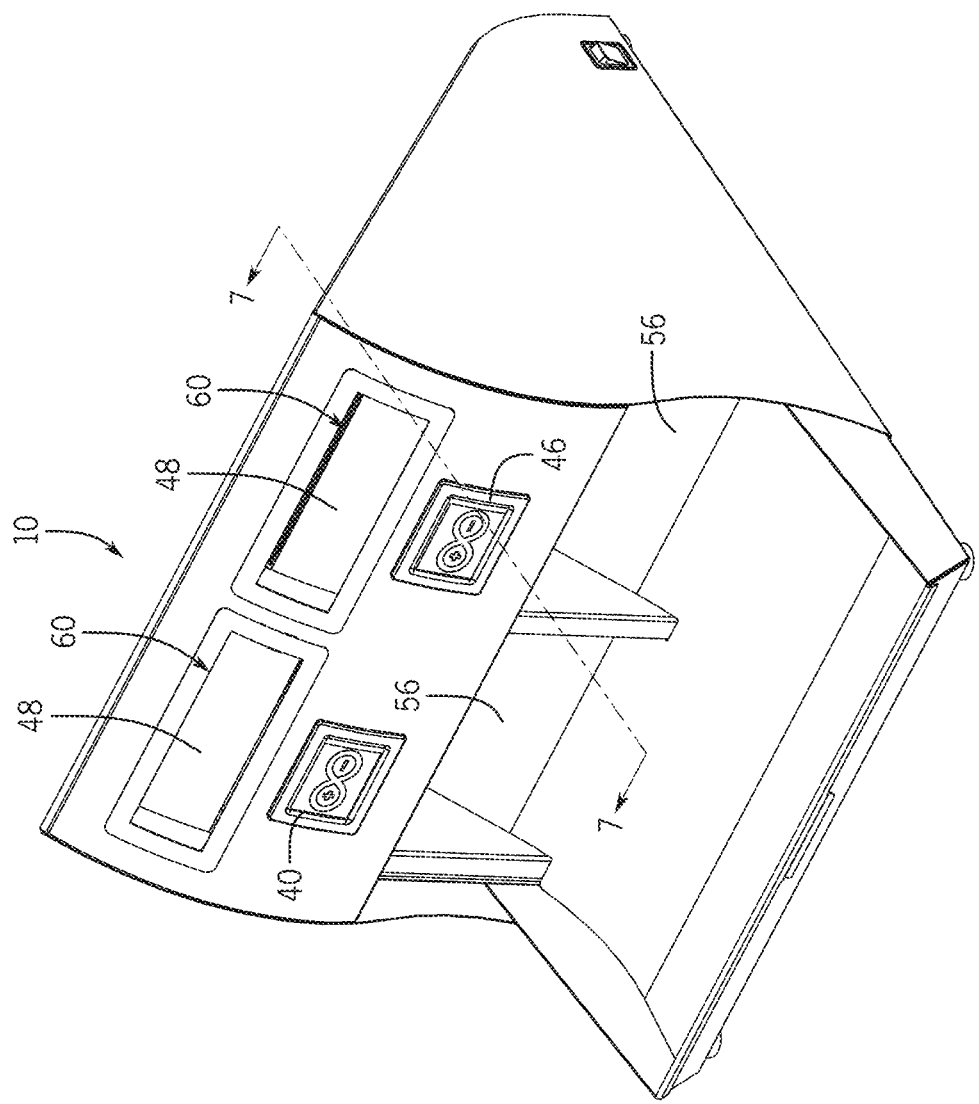
FIG. 6 depicts an exemplary embodiment of a toaster in an angled configuration.

FIGS. 6 and 7 depict a still further exemplary embodiment of the toaster 10 in which the toaster 10 is arranged in an angled orientation. FIG. 6 depicts a toaster 10 of this embodiment while FIG. 7 is a cross sectional view taken along line 7-7 of FIG. 6. As with the embodiment as depicted in FIGS. 4 and 5, it will be recognized that like reference numerals within these Figures identify like components between the embodiments while some or all of the features as described with respect to the embodiments of FIGS. 6 and 7 may be used with r combined with features as described above or as further described herein in order to arrive at still further exemplary embodiments of toaster that are within the scope of the present disclosure.

As best seen in FIG. 7, the toasting area 50, as well as much of the operational components of the toaster 10, are arranged at an angle. In such an embodiment, the user may insert the food product directly into an opening 60 as selectively blocked by the safety doors 48. The heating area 50 interior of the opening 60 is also arranged at an angle and is defined by a toasting IR source 12a, and a heating IR source 12b. The heating IR source 12b also forms the bottom tray 54. A cradle 58 is exposed at the internal end of the toasting area 50 and serves to receive the food product within the toasting area 50 and to help to align the food product relative to the toasting IR source 12a and to the heating IR source 12b for consistent and repeated toasting. Upon completion of the toasting operation, the bottom tray 54, including the heating IR source 12b slides in the direction of arrow 62 internal to the toaster 10 to move the tray 54 out of the way of the toasted food product. The toasted food product falls out of the toasting area 50 onto the exit ramp 56 to dispense from the toaster 10.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A toaster comprising:
   a support configured to hold a food product;
   an infrared (IR) source arranged relative to the support and operable to direct IR energy to the food product on the support;
   a light source arranged relative to the support and operable to illuminate the food product on the support while the IR source operates to direct the IR energy;
   a camera that operates to capture successive digital images of the food product on the support; and
   a processor that receives the successive digital images from the camera, the processor analyzes the successive digital images received from the camera, determines a current toasting level of the food product from the successive digital images received from the camera based upon an amount of light in at least one test spectrum in each of the successive digital images, analyzes at least one digital image of the successive digital images from the camera to determine an initial color of the food product on the support and the processor determines a weighting value for the at least one test spectrum analyzed by the processor to determine a current toasting of the food product, operates the IR source to achieve a predetermined toasting level of the food product, and operates the IR source to terminate operation directing the IR energy when the predetermined toasting level is reached wherein the at least one test spectrum comprises a green light test spectrum and a red light test spectrum, and the weighting value for the red light test spectrum increases with increases in a darkness of the initial color of the food product.

2. The toaster of claim 1, wherein the light source operates to illuminate the support and the processor analyzes at least one digital image of the successive digital images from the camera to determine the presence of the food product on the support.

3. The toaster of claim 1, further comprising a predetermined static mask, wherein the processor applies the static mask to each digital image of the successive digital images received from the camera to limit portions of the received images analyzed to determine a current toasting of the food product.

4. A method of toasting comprising:
   holding a food product on a support relative to an infrared (IR) source;
   operating the IR source to direct IR energy to the food product on the support;
   illuminating the food product on the support;
   acquiring successive digital images of the food product on the support with a camera;
   determining a reference brightness for at least one test spectrum from a portion of an initial image of the successive digital images that does not include the food product;

determining a current brightness for at least one test spectrum from a same portion of a subsequent image of the successive digital images from the camera;

calculating a brightness compensation factor for at least one test spectrum from the reference brightness and the current brightness;

analyzing the successive digital images acquired by the camera to determine a current toasting level of the food product based upon an amount of light in at least one test spectrum in each of the digital images acquired by the camera;

further using the brightness compensation factor for at least one test spectrum in calculating the current toasting level of the food product;

determining when the current toasting level of the food product reaches a predetermined toasting level of the food product; and operating the IR source to terminate direction of IR energy to the food product when the predetermined toasting level of the food product is reached.

5. The method of claim 4, further comprising:

determining an initial color of the food product by analyzing an initial image from the camera; and determining a weighting value, based upon the initial color, for the at least one test spectrum to determine the current toasting level of the food product.

6. A toaster comprising:

a support configured to hold a food product;

an infrared (IR) source arranged relative to the support and operable to direct IR energy to the food product on the support;

a light source arranged relative to the support and operable to illuminate the food product on the support while the IR source operates to direct the IR energy;

a camera that operates to capture successive digital images of the food product on the support; and a processor that receives the successive digital images from the camera, the processor analyzes the successive digital images received from the camera, determines a current toasting level of the food product from the successive digital images received from the camera based upon an amount of light in at least one test spectrum in each of the successive digital images and a brightness compensation factor for at least one test spectrum, operates the IR source to achieve a predetermined toasting level of the food product, and operates the IR source to terminate operation directing the IR energy when the predetermined toasting level is reached;

wherein the processor calculates the at least one brightness compensation factor based upon a reference brightness for at least one test spectrum determined from a portion of an initial image of the food product, acquired by the camera, wherein the portion does not include the food product, the at least one brightness compensation factor further calculated based upon a current brightness for at least one test spectrum determined from a same portion of at least one digital image of the successive digital images from the camera.

7. The toaster of claim 6, wherein the light source operates to illuminate the support and the processor analyzes at least one digital image of the successive digital images from the camera to determine the presence of the food product on the support.

8. The toaster of claim 6, further comprising a predetermined static mask, wherein the processor applies the static mask to each digital image of the successive digital images received from the camera to limit portions of the received images analyzed to determine a current toasting of the food product.

9. A toaster comprising:

a support configured to hold a food product;

an infrared (IR) source arranged relative to the support and operable to direct IR energy to the food product on the support;

a light source arranged relative to the support and operable to illuminate the food product on the support while the IR source operates to direct the IR energy;

a camera that operates to capture successive digital images of the food product on the support; and a processor that receives the successive digital images from the camera, the processor analyzes the successive digital images received from the camera, determines a current toasting level of the food product from the successive digital images received from the camera based upon an amount of light in at least one test spectrum in each of the successive digital images, operates the IR source to achieve a predetermined toasting level of the food product, and operates the IR source to terminate operation directing the IR energy when the predetermined toasting level is reached;

wherein the processor applies an image tearing mask to each digital image of the successive digital images received from the camera and passes or rejects each digital image of the successive digital images for use in determining the current toasting of the food product based upon the application of the image tearing mask.

10. The toaster of claim 9, wherein the light source operates to illuminate the support and the processor analyzes at least one digital image of the successive digital images from the camera to determine the presence of the food product on the support.

11. The toaster of claim 9, further comprising an ejector operatively connected to the support and to the processor, wherein the processor operates the ejector to remove the bread product from proximity to the IR source when the predetermined toasting level is reached.

12. A toaster comprising:

a support configured to hold a food product;

an infrared (IR) source arranged relative to the support and operable to direct IR energy to the food product on the support;

a light source arranged relative to the support and operable to illuminate the food product on the support while the IR source operates to direct the IR energy;

a camera that operates to capture successive digital images of the food product on the support; and a processor that receives the successive digital images from the camera, the processor analyzes the successive digital images received from the camera, determines a current toasting level of the food product from the successive digital images received from the camera based upon an amount of light in at least one test spectrum in each of the successive digital images, determines a dynamic mask based upon at least one digital image of the successive digital images from the camera, wherein the dynamic mask includes at least one calculated boundary of the food product in the at least one image, applies the dynamic mask to subsequent images of the successive digital images received from the camera to limit portions of the received images analyzed to determine a current toasting of the food product, operates the IR source to achieve a predetermined toasting level of the food product, and operates the IR source to terminate operation directing the IR energy when the predetermined toasting level is reached.

13. The toaster of claim 12, wherein the light source operates to illuminate the support and the processor analyzes at least one digital image of the successive digital images from the camera to determine the presence of the food product on the support.

14. The toaster of claim 12, further comprising an ejector operatively connected to the support and to the processor, wherein the processor operates the ejector to remove the bread product from proximity to the IR source when the predetermined toasting level is reached.

15. A toaster comprising:
a support configured to hold a food product;
an infrared (IR) source arranged relative to the support and operable to direct IR energy to the food product on the support, the IR source is configured as an annulus;
a light source arranged relative to the support and operable to illuminate the food product on the support while the IR source operates to direct the IR energy;
a camera that operates to capture successive digital images of the food product on the support, the camera is positioned centrally to the IR source and recessed from an outer surface of the IR source in a direction away from the food product; and
a processor that receives the successive digital images from the camera, the processor analyzes the successive digital images received from the camera and based upon an analysis operates the IR source to achieve a predetermined toasting level of the food product, wherein the processor operates the IR source to terminate operation directing the IR energy when the predetermined toasting level is reached.

16. The toaster of claim 15, wherein the light source operates to illuminate the support and the processor analyzes at least one digital image of the successive digital images from the camera to determine the presence of the food product on the support.

17. The toaster of claim 15, further comprising an ejector operatively connected to the support and to the processor, wherein the processor operates the ejector to remove the bread product from proximity to the IR source when the predetermined toasting level is reached.

18. A toaster comprising:
a support configured to hold a food product;
an infrared (IR) source arranged relative to the support and operable to direct IR energy to the food product on the support, the IR source is configured as an annulus;
a light source arranged relative to the support and operable to illuminate the food product on the support while the IR source operates to direct the IR energy;
a camera that operates to capture successive digital images of the food product on the support, the camera is positioned centrally to the IR source;
a forced gas source and a duct that opens about the camera between the camera and the IR source to produce a flow of forced gas about the camera; and
a processor that receives the successive digital images from the camera, the processor analyzes the successive digital images received from the camera and based upon the analysis operates the IR source to achieve a predetermined toasting level of the food product, wherein the processor operates the IR source to terminate operation directing the IR energy when the predetermined toasting level is reached.

19. The toaster of claim 18, wherein the light source operates to illuminate the support and the processor analyzes at least one digital image of the successive digital images from the camera to determine the presence of the food product on the support.

20. The toaster of claim 18, further comprising an ejector operatively connected to the support and to the processor, wherein the processor operates the ejector to remove the bread product from proximity to the IR source when the predetermined toasting level is reached.

* * * * *